United States Patent [19]

Hu et al.

[11] Patent Number: 5,562,866
[45] Date of Patent: Oct. 8, 1996

[54] FORMULATED BRANCHED CHAIN ALCOHOL ETHER SULFATE COMPOUNDS

[75] Inventors: Patrick C. Hu; Raynold J. Corona, both of Baton Rouge, La.

[73] Assignee: Albemarle Corporation, Richmond, Va.

[21] Appl. No.: 493,186

[22] Filed: Jun. 20, 1995

[51] Int. Cl.$^6$ .................................................. C11D 1/14
[52] U.S. Cl. ........................ 510/432; 558/20 R; 558/44; 510/284; 510/495; 510/537
[58] Field of Search ............................ 252/549, 550, 252/551; 558/20 R, 44

[56] References Cited

U.S. PATENT DOCUMENTS

| | | | |
|---|---|---|---|
| 2,508,036 | 5/1950 | Kosmin | 260/615 |
| 2,624,766 | 1/1953 | Butler | 260/615 |
| 2,644,833 | 7/1953 | Kosmin | 260/458 |
| 2,647,913 | 8/1953 | Kosmin | 260/458 |
| 2,671,115 | 3/1954 | Kosmin | 260/615 |
| 2,844,534 | 7/1958 | Cottle et al. | 252/32 |
| 2,864,717 | 12/1958 | Lyons | 106/287 |
| 2,979,533 | 4/1961 | Bruson et al. | 260/613 |
| 3,682,849 | 8/1972 | Smith et al. | 260/615 B |
| 3,887,624 | 6/1975 | Gipson et al. | 260/615 B |
| 3,936,537 | 2/1976 | Baskerville, Jr. et al. | 427/242 |
| 3,952,068 | 4/1976 | Gipson et al. | 260/632 R |
| 3,985,669 | 10/1976 | Krummel et al. | 252/116 |
| 4,000,091 | 12/1976 | Wentler | 252/524 |
| 4,000,092 | 12/1976 | Wentler | 252/526 |
| 4,000,093 | 12/1976 | Nicol et al. | 252/529 |
| 4,019,998 | 4/1977 | Benson et al. | 252/135 |
| 4,019,999 | 4/1977 | Ohren et al. | 252/140 |
| 4,123,377 | 10/1978 | Davey et al. | 252/103 |
| 4,174,305 | 11/1979 | Burns et al. | 252/545 |
| 4,265,777 | 5/1981 | Boyer et al. | 252/113 |
| 4,303,557 | 12/1981 | Rose | 252/527 |
| 4,308,151 | 12/1981 | Cambre | 252/8.8 |
| 4,321,157 | 3/1982 | Harris et al. | 252/174.25 |
| 4,340,382 | 7/1982 | Morlino et al. | 8/137 |
| 4,343,713 | 8/1982 | Wise | 252/92 |
| 4,344,871 | 8/1982 | Allaway et al. | 252/531 |
| 4,391,726 | 7/1983 | Koster | 252/99 |
| 4,404,128 | 9/1983 | Anderson | 252/546 |
| 4,426,542 | 1/1984 | Barker et al. | 568/883 |
| 4,671,894 | 6/1987 | Lamb et al. | 252/545 |
| 4,719,025 | 12/1988 | Hardy | 252/78.1 |
| 4,857,213 | 8/1989 | Caswell et al. | 252/8.75 |
| 5,075,026 | 12/1991 | Loth et al. | 252/122 |
| 5,104,568 | 4/1992 | Shaw, Jr. et al. | 252/174.18 |
| 5,215,683 | 6/1993 | Kravetz et al. | 252/550 |

*Primary Examiner*—Paul Lieberman
*Assistant Examiner*—Necholus Ogden
*Attorney, Agent, or Firm*—Philip M. Pippenger

[57] ABSTRACT

Certain double-tailed alcohol ether sulfates of specified chemical structures are formulated with a hydrotrope or a co-surfactant. The formulations are useful for various surfactant utilities including use in hard water systems.

20 Claims, No Drawings

FORMULATED BRANCHED CHAIN ALCOHOL ETHER SULFATE COMPOUNDS

TECHNICAL FIELD

This invention relates to formulations of certain branched chain compounds having surfactant properties enabling their use as wetting agents, solubilizing agents, washing agents, dispersing agents, emulsifying agents, and/or scouring agents.

BACKGROUND

In U.S. Pat. Nos. 3,887,624 and 3,952,068, R. M. Gipson, F. E. Bentley and J. G. Milligan describe vinylidene alcohol compositions having improved properties for surfactant uses as compared to similar prior linear alcohol-based surfactants and prior highly branched alcohol-based surfactants. In addition to primary vinylidene alcohols, these patents disclose ethoxylates of vinylidene alcohols having the formula $R_z''''$—$(OC_2H_4)_w$—OH where z is the number of carbon atoms in the alkyl group, $R''''$, and w is 7 to 15 and preferably 7 to 12, and represents the average number of oxyethylene groups present in the ethoxylate. Stressed in the patents is the desirability of having the ratio of w to z within the range of 0.685 to 0.755, and also of having z equal to 13 and w in the range of 9 to 10. These two patent disclosures are fully incorporated herein by reference for all purposes.

In commonly-owned copending application Ser. No. 08/493,189 filed Jun. 20, 1995, our colleagues J. D. Sauer, E. F. Zaweski, M. E. Tuvell, F. E. Trowbridge and D. W. Bunch have described certain double-tailed alcohol ether sulfates and their uses, including results on a formulation of this invention.

The double-tailed alcohol ether sulfates of our colleagues have desirable properties and utilities. For example, those double-tailed sulfates are better suited than linear alcohol ether sulfates for use in "gel"-type and transparent/translucent products. Presumably this is due to the ability of those double-tailed sulfates to form a gel rather than a crystalline precipitate when their concentration in water is increased. An object of this invention is to provide formulations of the double-tailed alcohol ether sulfates of our colleagues having enhanced properties and utilities so that the full potential of such sulfates for general purpose detergent usage is improved.

SUMMARY OF THE INVENTION

In accordance with this invention formulations are provided which comprise:

A) at least one alcohol ether sulfate of the formula:

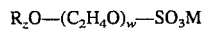

$$R_zO—(C_2H_4O)_w—SO_3M \quad (I)$$

where R is an alkyl group which is bifurcated at the 3-position and each branch has at least 4 carbon atoms (preferably at least 5 carbon atoms, and most preferably at least 6 carbon atoms); M is an alkali metal, ammonium, or alkylolammonium (preferably sodium and/or potassium); z is the number of carbon atoms in R, and is 15 to 33 (preferably 17 to 25); and w is 1 to 6.5 (preferably 2 to 6); and B) at least one hydrotrope or at least one co-surfactant, or a combination of at least one hydrotrope and at least one co-surfactant.

Other suitable components of the types referred to hereinafter can be included in the formulations of this invention.

Preferred alcohol ether sulfates may be depicted by the formula:

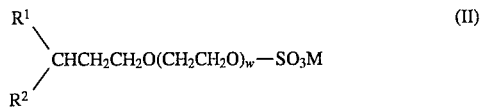

where $R^1$ and $R^2$ are straight chain alkyl groups each having at least 4 carbon atoms (preferably at least 5 carbon atoms, and most preferably at least 6 carbon atoms) and the total number of carbon atoms in $R^1$ and $R^2$ is from 12 to 30 (preferably 14 to 22), and M and w are as defined above.

Preferred hydrotropes include alkanols and alkoxyalkanols, and alkali metal salts of aryl sulfonates in which the aryl group is a naphthyl group or preferably a phenyl group, either said group being unsubstituted or more preferably having from 1 to 2 alkyl substituents thereon in which the total number of carbon atoms of the 1 or 2 alkyl substituents is from 1 to 4. Preferred co-surfactants include water-soluble alkylphenol ethoxylates, water-soluble linear alcohol ethoxylates and water-soluble amine oxides.

These and other embodiments and features of this invention will be still further apparent from the ensuing description and ensuing claims.

FURTHER DESCRIPTION OF THE INVENTION

Component A)

As described in the above-referred-to copending application, the double-tailed alcohol ether sulfates used as component A) herein are prepared from double-tailed nonionic ethoxylates of certain vinylidene alcohols having less than 7, or an average of less than 7, oxyethylene groups per molecule, and a ratio of the number of ethyleneoxy groups (w) to carbon atoms in the alkyl group (z) of 0.433 or less. These compounds have the formula:

$$R_z—(OC_2H_4)_w—OH \quad (III)$$

where R, z and w are as defined above in connection with formula (I). The highest ratio of w to z exists when w is 6.5 and z is 15, whereby the ratio w/z is 0.433. Depending on the preparative and if any, recovery and/or purification procedures employed in forming compounds of formula (III), they may be associated with minor amounts (i.e. less than 50 mol %, preferably less than 30 mol % and more preferably less than 10 mol %) of other isomers or by-products.

Formula (IV) further illustrates the structure of the major isomer (50 mol % or more) of the compounds of formula (III):

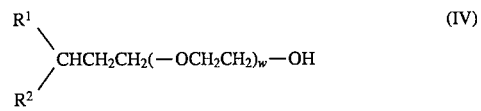

where $R^1$, $R^2$ and w are as defined above.

To prepare the products used as component A) hereof, various methods can be used. One preferred method, which starts with an olefin, is:

a) dimerization of a straight chain 1-alkene using an aluminum alkyl dimerization catalyst to form a vinylidene olefin having one carbon atom less than the desired value for z in formulas (I) and (III) above;

b) hydroformylation of the vinylidene olefin under typical hydroformylation (oxo) reaction conditions involving reaction with carbon monoxide and hydrogen, and a suitable catalyst (which typically is a complex of cobalt carbonyl or rhodium carbonyl) to produce a branched chain primary alcohol having one additional carbon atom in the 1-position;

c) ethoxylation of the branched chain primary alcohol with ethylene oxide under typical ethoxylation reaction conditions to form a product of formula (III); and d) sulfating the product of formula (III) and neutralizing the sulfated product with the appropriate base. A route based on use of formaldehyde and hydrogenation in place of the oxo reaction of b) above can be used. As will be seen hereinafter, other methods also can be employed, if desired.

As our colleagues explain in the copending application referred to above, the compounds used as component A) herein have a "double tailed" configuration in a hydrophobic alkyl group, and hydrophilic functionality at the end of the molecule. Hydrophobic and hydrophilic balance is a property of importance for surfactant utilities.

The following examples illustrate methods which can be used to synthesize the compounds used as component A) of this invention, including methods for making intermediates for use in making such compounds. A two-step hydroformylation reaction for converting a vinylidene olefin into a primary oxo alcohol intermediate is given in Example 1.

EXAMPLE 1

Synthesis of Double-Tailed Alcohol Intermediate

A 1-liter autoclave is charged with 336 g (1.5 mol) of distilled 2-hexyl-1-decene formed by dimerization of 1-octene using tri-n-octylaluminum catalyst, 10.1 g (0.0295 mol) of $Co_2(CO)_8$ and 131 g of toluene. The autoclave is sealed, flushed with synthesis gas ($H_2$/CO), and pressured to 2026 psig at 32° C. with synthesis gas and heated to 130° C. Autoclave temperature is maintained at 130° C. while synthesis gas pressure is maintained at 3000 psig during repressurization. After 21 hours the autoclave contents are cooled to 32° C., vented and flushed with hydrogen. The autoclave is then pressured with hydrogen to 2370 psig and heated to 190° C. The pressure is then increased to 3142 psig with hydrogen and held under these conditions for 18 hours. The autoclave contents are then cooled to room temperature, vented, flushed with nitrogen, and discharged. The product mixture is subjected to fractional distillation to recover a fraction boiling in the range of 97°–110° C. at 0.1–0.4 mm of Hg pressure. In a reaction conducted in accordance with the forgoing procedure a product, shown by nmr to contain 96.3 mol % of primary alcohols, was recovered. The major portion of the product corresponds to 3-hexyl-1-undecanol.

Example 2 illustrates a one-step hydroformylation procedure for producing a primary oxo alcohol for use in preparing a component A) product.

EXAMPLE 2

Synthesis of Double-Tailed Alcohol Intermediate

To a 1-liter autoclave are charged 336 g (1.5 mol) of distilled 2-hexyl-1-decene formed by dimerization of 1-octene using tri-n-octylaluminum catalyst, 10.1 g (0.0295 mol) of $Co_2(CO)_8$, 13.03 g (0.0590 mol) of 9-phenyl-9-phosphabicyclononane, and 146 g of toluene. The autoclave is sealed, flushed with a mixture of hydrogen and carbon monoxide containing approximately 14 wt % hydrogen ($2H_2$/CO), pressured to 1097 psig at 22° C., and heated to and held at 200° C. Pressure uptake occurs at about 190° C. When the pressure drops to 1500 psig, the autoclave is repressured to 2000 psig with the same synthesis gas mixture. After 21 hours the autoclave contents are cooled to room temperature, vented and flushed with nitrogen. The autoclave is then pressured with hydrogen to 2370 psig and heated to 190° C. The pressure is then increased to 3142 psig with hydrogen and held under these conditions for 18 hours. The autoclave contents are then cooled to room temperature, vented, flushed with hydrogen, and discharged. The product mixture is stripped of toluene and subjected to fractional distillation to recover a fraction boiling in the range of 120°–126° C. at 0.15–0.05 mm of Hg pressure. In a reaction conducted in accordance with the forgoing procedure, a product shown by vpc to contain 96.2 area % of primary alcohols was formed. NMR indicated that 75 mol % of the product was 3-hexyl-1-undecanol, along with 22.8 mol % of an isomeric branched chain primary alcohol. The balance (2.2 mol %) was formate ester.

Example 3 illustrates a typical ethoxylation procedure for producing a product of formula (III) above by ethoxylation.

EXAMPLE 3

Mixed Ethoxylates of 3-Hexyl-1-Undecanol (5:1 Mol Ratio)

To an autoclave are charged 0.5 mol of 3-hexyl-1-undecanol as the 75 mol % product formed as in Example 2, and 0.5 g of potassium hydroxide flakes. While holding the temperature at 140° C., ethylene oxide is slowly charged until 110 g (2.5 mols) of ethylene oxide has been charged. The KOH catalyst is neutralized with oxalic acid, and the product mixture is filtered using filter aid.

Examples 4–11 illustrate the Williamson ether synthesis procedure which can be used.

EXAMPLE 4

Synthesis of Ethoxylated Double-Tailed Alcohol Intermediate

To a 500 mL round bottom flask containing 102.4 (0.4 mol) of $C_{17}H_{35}OH$ (oxo alcohol) formed as in Example 2 and 1.0 g (0.0064 mol) of $C_{10}H_{21}NH_2$ (decylamine) is added 57.1 g (0.48 mol) of $SOCl_2$ (thionyl chloride) at 80° C. over a three (3) hour period. Reaction is allowed to continue overnight at 80° C. The reaction mixture taken up in benzene and washed with water. The organic layer is separated and rotary evaporated at aspirator pressure and 90° C. The organic reaction residue is fractionally distilled to give product boiling at 117°–123° C. at 0.05 mm Hg pressure. The product is indicated by GC/mass spectral analysis to contain two isomeric forms of $C_{17}H_{35}Cl$. The main isomer is $C_8H_{17}(C_6H_{13})CH$—$CH_2$—$CH_2Cl$. The other isomer is $C_7H_{15}CH(CH_2Cl)$—CH—$C_6H_{13}$—$CH_3$.

EXAMPLE 5

Triethoxylate of 3-Hexyl-1-Undecanol

To a reaction flask under a nitrogen atmosphere containing 52.86 g (0.35 mols) of dried $H(OCH_2CH_2)_3OH$ (triethylene glycol) is slowly added pieces of potassium metal (3.42 g, 0.088 mol). After potassium addition is completed, the reaction mass is heated at 100° C. for 4 hours. Reaction mass temperature is then increased to 140° C. and 20.06 g (0.073 mol) of $C_{17}H_{35}Cl$ from Example 4 is added over 3 hours. Reaction is allowed to continue overnight. GC shows most of the chloride has reacted to give a small amount of $C_{17}$ olefin but mostly the desired $C_{17}H_{35}(OCH_2CH_2)_3OH$ where the $C_{17}$ alkyl group of the principal isomer is $C_8H_{17}(C_6H_{13})CH$—$CH_2$—$CH_2$—. The reaction mass is diluted with water to remove residual triethylene glycol. The benzene solution is rotary evaporated under aspirator pressure and 90° C. to remove the benzene. The organic residue is fractionally distilled to give the following a purer product of Formula (III) above, boiling in the range of 187°–197° C., mainly $C_8H_{17}(C_6H_{13})CHCH_2CH_2(OCH_2CH_2)_3OH$.

EXAMPLE 6

Pentaethoxylate of 3-Hexyl-1-Undecanol

To a 500 mL round bottom flask equipped with stirrer, condenser, thermometer and addition funnel is added 221.56 g (0.93 mol) of pentaethylene glycol ($H(OCH_2CH_2)_5OH$. To this is added 9.36 g (0.24 mol) of potassium metal pieces over ½ hour and then the system is heated to 80° C. The reaction mass is stirred at 80° C. until the reaction mass is amber and homogeneous. To this reaction mass at 140° C. is added over a period of 60 minutes, 54.9 g (0.2 mol) of $C_{17}H_{35}Cl$ (oxo chloride) formed as in Example 4. The reaction temperature is increased to 160° C. for 16 hours, then increased to 180° C. for 8 hours, and then again increased and held at 200° C. for 16 hours. The reaction mass is cooled to room temperature, diluted with benzene and washed with water to remove residual pentaethylene glycol. The benzene solution is rotary evaporated to remove the benzene, and then is fractionally distilled. The desired product is recovered in the ranges of from 224° C. at 0.05 mm to 248° C. at 0.2 mm. The product is composed of two isomers, one of which is $C_8H_{17}(C_6H_{13})CHCH_2CH_2(OCH_2CH_2)_5OH$.

EXAMPLE 7

Synthesis of Chloroethoxy Intermediate

To a 3-neck round bottom flask is added 15.3 g (0.32 mol) of $C_{17}H_{35}(OCH_2CH_2)_5OH$ and 0.08 g (0.0005 mol) of $C_{10}H_{21}NH_2$. This is heated to 80° C. and 4.59 g (0.0386 mol) of thionyl chloride ($SOCl_2$) is added over 2 hours and allowed to continue at this temperature for 5 hours. The reaction mixture is cooled to room temperature, diluted with pentane and water washed. The pentane solution is dried over anhydrous $MgSO_4$ and rotary evaporated to give over 90% yield of product indicated by GC/mass spectral data to be consistent with $C_{17}H_{35}(OCH_2CH_2)_4$—O—$CH_2CH_2Cl$.

EXAMPLE 8

6.4-Ethoxylate of 3-Hexyl-1-Undecanol

To a reaction flask containing dried diethylene glycol, $H(OCH_2CH_2)_2OH$, 13.59 g (0.128 mol) is added 1.25 g (0.032 mol) of potassium metal. The mixture is stirred for 3 hours at ambient temperature and then for 4 hours at 130° C. The temperature is raised to 160° C. and 14.74 g (0.0298 mol) of product of Example 7, $C_{17}H_{35}(OCH_2CH_2)_4$—O—$CH_2CH_2Cl$ is added over 2 hours. The temperature is held at 160° C. for 12 hours, at 180° C. for 24 hours, at 200° C. for 24 hours, and finally at 220° C. for 48 hours. The reaction mass is cooled to room temperature, diluted with hexane, washed with water, dried over anhydrous $MgSO_4$, filtered and rotary evaporated at aspirator pressure and 90° C. The organic residue is Kugel-Rohr distilled up to 170° C. and 0.4 mm to give a forecut and a pot residue. The pot residue is indicated by GC/mass spectral analysis to be $C_{17}H_{35}(OCH_2CH_2)_{6.4}OH$, which thus contains the desired isomer $C_8H_{17}(C_6H_{13})CHCH_2CH_2(OCH_2CH_2)_{6.4}OH$.

EXAMPLE 9

Tetraethoxylate of 3-Hexyl-1-Undecanol

To a reaction flask containing distilled tetraethylene glycol, $H(OCH_2CH_2)_4OH$, 114 g (0.58 mol) is added 5.75 g (0.147 mol) of potassium metal over a period of 2 hours while maintaining temperature below 65° C. After potassium has reacted, the temperature is raised to 140° C. while $C_{17}H_{35}Cl$ (oxo chloride, formed as in Example 4) is added over 2 hours. The temperature is increased to 160° C. and kept there for 24 hours. The reaction mass is cooled to room temperature, dissolved in benzene and washed with warm water. The benzene solution is then rotary evaporated and then fractionally distilled to give the desired product: $C_{17}H_{35}(OCH_2CH_2)_4OH$ mainly as two isomers one of which is $C_8H_{17}(C_6H_{13})CHCH_2CH_2(OCH_2CH_2)_4OH$.

EXAMPLE 10

Diethoxylate of 3-Hexyl-1-Undecanol

To a round bottom flask is added 42.4 (0.4 mol) of diethylene glycol under a nitrogen atmosphere. To this reaction mass is added 2.3 g (0.1 mole) of sodium over 1 hour. The reaction mass is heated to 130° C. whereby all of the sodium has reacted. Then 27.4 g (0.1 mol) of $C_{17}H_{35}Cl$ is added over 1 hour and then kept for 17 hours at these conditions. Reaction temperature is then increased to 140° C. and kept for 17 hours at these conditions for 24 hours. The reaction mass upon cooling consists of 2 layers. GC shows the bottom layer to be mostly diethylene glycol. The reaction mass is filtered and the bottom diethylene glycol layer separated. The top organic layer is diluted with diethyl ether, water washed and dried over anhydrous $MgSO_4$. After filtering, the organic layer is fractionally distilled to give a fraction at from 200°–220° C. and 2.25–2.5 mm containing the desired product, $C_{17}H_{35}O(CH_2CH_2O)_2OH$, in two isomeric forms, one of which is the desired isomer of this invention, namely $C_8H_{17}(C_6H_{13})CHCH_2CH_2(OCH_2CH_2)_2OH$.

Example 11 sets forth a general procedure suitable for use in converting the ethoxylates of formula (III) into the sulfated double-tailed alcohol ethoxylates (alcohol ether sulfates) of formula (I) for use as component A) of this invention.

EXAMPLE 11

Sulfated Ethoxylates of 3-Alkyl-1-Alkanols

To a 3-neck round bottom flask equipped with nitrogen jacketed addition funnel, mechanical stirrer, thermometer and gas exit tube is added the 3-alkyl-1-alkanol compound(s) of this invention to be sulfated. An equivalent amount up to 4% excess of chlorosulfonic acid is added over a period of 30 to 60 minutes, while maintaining the temperature below 30° C. if the system is homogeneous, or at 40° to 55° C. if a solid phase exists. The reaction mixture is then stirred for an additional 30 minutes or until HCl evolution ceases or at least has slowed down substantially. At this point an equivalent of the selected base, such as sodium hydroxide, potassium hydroxide, ammonium hydroxide, etc., is added together with sufficient water to form a 10% to 30% solution.

Another useful method of making the double-tailed alcohol ether sulfates for use as component A) of this invention is to react the compounds of formula (III) above with sulfur trioxide in a falling-film reactor, followed by neutralization with a suitable base. For example use of aqueous sodium hydroxide enables the formation of thick slurries, paste, or fluid emulsions of the alcohol ether sulfates, depending upon the amount of water present.

Component B)

Among suitable hydrotropes for use as component B) are alkanols such as methanol, ethanol, 1-propanol, 2-propanol, 1-butanol, 2-butanol, 2-methyl-1-propanol, 1,1-dimethyl-1-ethanol, 1-pentanol, 2-pentanol, 3-pentanol, 2-methyl-1-butanol, 3-methyl-1-butanol, 1,2-dimethyl-1-propanol, 1,1-dimethyl-1-propanol, and the various isomers of hexanol, of heptanol, of octanol, of nonanol, and of decanol. Mixtures of such alkanols can be used. Alkanols having a solubility in water at 20° C. of at least 3 grams per 100 mL of water are preferred, and those having a solubility of at least 6 grams per 100 mL of water more preferred.

Alkoxyalkanols including mixtures thereof are also suitable for use as hydrotropes in the compositions of this invention. Examples include 2-methoxyethanol, 2-ethoxyethanol, 2-propoxyethanol, 2-methoxy-1-propanol, 2-ethoxyethoxyethanol, 2-butoxyethanol, 4-ethoxy-1-butanol, and similar analogs and homologs which preferably have a solubility in water at 20° C. of at least 3 grams per 100 mL and more preferably at least 6 grams per 100 mL.

Water-soluble glycols such as the water-soluble polyoxyethylene glycols can also be employed.

Mixtures of the preceding alkanols, alkoxyalkanols and glycols or any combination of two of them are also suitable for use.

The alkali metal aryl sulfonates useful as hydrotropes in the compositions of this invention include the lithium, sodium and potassium salts of such sulfonic acids as benzene sulfonic acid, toluene sulfonic acid, xylenesulfonic acid, ethylbenzene sulfonic acid, propylbenzene sulfonic acid, isopropylbenzene sulfonic acid, butylbenzene sulfonic acid, ethyltoluene sulfonic acid, propyltoluene sulfonic acid, ethylxylenesulfonic acid, diethylbenzene sulfonic acid, 1-naphthalene sulfonic acid, 2-naphthalene sulfonic acid, the various methyl-substituted naphthalene sulfonic acids, the various ethyl-substituted naphthalene sulfonic acids, and the like. The alkali metal salts of trimethylbenzene sulfonic acids and trimethylnaphthalene sulfonic acids can also be used. Ammonium salts of the foregoing sulfonic acids are also suitable. Mixtures of any of these various types of sulfonate salts can be employed.

Among suitable co-surfactants are the water-soluble alkylphenolethoxylates such as the water-soluble ethoxylates of octylphenol, nonylphenol, decylphenol, undecylphenol, dodecylphenol and their water-soluble analogs and homologs. Generally the alkyl substituent is in the 4-position and is a branched alkyl group. However compounds in which the alkyl is in an ortho-position are also suitable. Mixtures of the ortho- and para-alkylphenolethoxylates can also be used. A number of these materials can be purchased on the open market, such as, for example, a product known to the trade as NPE-9.

Another class of very useful co-surfactants is comprised of the water-soluble linear alcohol ethoxylates. These usually are derived by ethoxylating linear alcohols having from about 9 to about 18 carbon atoms per molecule or mixtures of alcohols having an average number of carbon atoms in this range. Typically the ethoxylate will have an average of from about 4 to about 15 ethyleneoxy groups per molecule. An example of a commercial product of this type is Neodol® 25-7.

The amine oxide co-surfactants useful in the practice of this invention have a hydrophobic aliphatic hydrocarbyl group and a terminal amine oxide functional group: R-NO, where R is typically an alkyl group having in the range of 8 to 18 carbon atoms. A few illustrative examples include dodecylamine oxide, tridecylamine oxide, and tetradecylamine oxide, including mono- or polymethyl and/or mono- or polyethyl branched isomers of such compounds.

Other useful hydrotropes and co-surfactants should now be apparent to those skilled in the art from a consideration of the foregoing illustrative description.

The hydrotropes and co-surfactants are employed in proportions sufficient to form a one-phase system in the presence of excess water. Thus the relative proportions of components A) and B) hereof will vary depending upon the identity and composition of these components. Generally speaking however, the weight ratio of A) to B) will usually fall within the range of about 0.5 to about 3.0 parts by weight of component B) per part by weight of component A). Preferred proportions are typically in the range of about 0.8 to about 2.5 parts by weight of component B) per part by weight of component A). It will be appreciated however that departures from the foregoing ranges can be made whenever deemed necessary or desirable, and such departures are deemed to be within the ambit of this invention.

The excellent effectiveness of the formulations of this invention is illustrated by the comparative experiments described in Example 12, wherein the surfactant is a double-tailed alcohol ether sulfate $(C_8H_{17}(C_6H_{13})CHCH_2CH_2O(CH_2CH_2O)_3SO_3$ Na, and the co-ingredient is a hydrotrope, namely 1-butanol.

EXAMPLE 12

A one-phase formulation comprising sulfated triethoxylate of 3-hexyl-1-undecanol as component A) and 1-butanol as component B) in a weight ratio of 0.64 part of A) per part of B) was compared against the leading commercial prewash spray-on product for effectiveness as a pre-soak brightener for laundry use with hard water. The pre-soak formulation of this invention was composed by weight of 6.4% of the sulfated triethoxylate of 3-hexyl-1-undecanol, 4.1% of 1-butanol serving as a hydrotrope, 4.4% of sodium chloride, 6.2% of mineral oil, and 78.9% of water. The commercial product is understood to contain a total of about 18.5% of four active surface active agents with the balance being water. Standard soiled-swatches of cotton cloth were dipped in one or the other of the respective formulations for 5 seconds, a period sufficient for achieving saturation. The treated swatches were then allowed to stand for specified time periods before being washed in a washing machine in the presence of a measured quantity of a commercial laundry detergent product. Water of 50 ppm (wt/wt) hardness (a 3:2 ratio of $Ca^{++}/Mg^{++}$) was used for the wash. Non-treated soiled swatches were also included in the wash as a control. After washing, the swatches were dried in a tumble dryer. The reflectance of the respective swatches was then measured using a Hunterlab Tristimulus Colorimeter, model D25M-9. The results of these tests are summarized in the table in which the values for the untreated cloth is the averaged measurements on 6 untreated cloths.

TABLE

| Formulation | Time Treated, minutes | L | a | b |
|---|---|---|---|---|
| Invention | 10 | 76.07 | 0.92 | 5.06 |
| Invention | 5 | 75.84 | 0.97 | 4.98 |
| Invention | 1 | 75.50 | 0.88 | 5.35 |
| | Average: | 75.80 | | |
| Commercial | 10 | 74.46 | 0.93 | 5.44 |
| Commercial | 5 | 74.34 | 0.96 | 5.16 |
| Commercial | 1 | 73.03 | 0.89 | 5.71 |
| | Average: | 73.94 | | |
| None | Untreated | 69.71 | 0.96 | 6.16 |

Experience has shown that a difference of 1.0 unit in the Hunter "L" value is statistically significant. The results thus indicate that the formulation of the invention was more effective than the commercial combination which contains a substantially larger amount of surfactants. Moreover this test work illustrates the fact that this invention enables the formation of cleansing systems in which oils or greasy substances and water can be made into one-phase systems, in this instance by a microemulsion mechanism. Further it is now possible pursuant to this invention to form microemusions using smaller amounts of hydrotropes or co-surfactants than required in prior formulations for pre-soak usage.

The formulations of this invention can be used in combination with other detergents, such as the detergents set forth in the listing of classes and species of detergents in U.S. Pat. No. 3,852,211 to Ohren issued Dec. 3, 1974, the full disclosure of which patent is incorporated herein by reference for all purposes. Thus, merely for the purposes of illustration and not limitation, the formulations of this invention can be used with such detergent types and components as are described in Columns 7–10 of U.S. Pat. No. 4,019,998 issued Apr. 26, 1977 to Benson et al, the full disclosure of which patent is incorporated herein by reference for all purposes. The formulations of this invention can also be used in combination, with or without other detergents, with ion exchange materials and builders such as aluminosilicates, zeolites, sodium tripolyphosphate, sodium pyrophosphate, and other builders such as are referred to as "auxiliary builders" in columns 13 and 14 of Krummel et al. U.S. Pat. No. 3,985,669 issued Oct. 12, 1976, the total disclosure of which patent is incorporated herein by reference for all purposes. Such "auxiliary builders" can be used in combination with aluminosilicate builders, or they can be used without use of an aluminosilicate. The formulations of this invention can be used in producing spray-dried granular detergent compositions, for example in accordance with the teachings of Ohren et al. U.S. Pat. No. 4,019,999 issued Apr. 26, 1977, the entire disclosure of which patent is incorporated herein by reference for all purposes. Additional components which can be used in formulations containing a combination of components A) and B) of this invention include those referred to in any of the foregoing patents to Ohren, to Benson et al., to Krummel et al., and to Ohren et al, or in any reference cited in any one or more of these patents.

This invention is susceptible to considerable variation in its practice. Therefore the foregoing description is not intended to limit, and should not be construed as limiting, the invention to the particular exemplifications presented hereinabove. Rather, what is intended to be covered is as set forth in the ensuing claims and the equivalents thereof permitted as a matter of law.

We claim:
1. A predominately aqueous surfactant formulation which comprises:
   A) at least one alcohol ether sulfate of the formula:

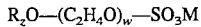
   $$R_zO\text{---}(C_2H_4O)_w\text{---}SO_3M$$

where R is an alkyl group which is bifurcated at the 3-position and each branch has at least 4 carbon atoms; M is an alkali metal, ammonium, or alkylolammonium; z is the number of carbon atoms in R, and is 15 to 33; and w is 1 to 6.5 or an average in the range of 1 to 6.5; and
   B) at least one hydrotrope or at least one co-surfactant, or a combination of at least one hydrotrope and at least one co-surfactant.

2. A formulation of claim 1 wherein B) is at least one hydrotrope selected from the group consisting of alkanols, alkoxyalkanols, and alkali metal salts of aryl sulfonates.

3. A formulation of claim 1 wherein B) is at least one water-soluble co-surfactant selected from the group consisting of alkylphenol ethoxylates, linear alcohol ethoxylates and amine oxides.

4. A formulation of claim 1 wherein z is 17 to 25.

5. A formulation of claim 1 wherein w is 2 to 6 or an average in the range of 2 to 6.

6. A formulation of claim 1 wherein M is sodium or potassium.

7. A formulation of claim 1 wherein z is 17 to 25 and w is 1 to 6 or an average in the range of 1 to 6, and wherein M is sodium or potassium.

8. A formulation of claim 1 wherein R is 3-hexyl-1-undecyl, w is 1, and M is sodium or potassium.

9. A formulation of claim 1 wherein R is 3-hexyl-1-undecyl, w is 2 or an average of about 2, and M is sodium or potassium.

10. A formulation of claim 1 wherein R is 3-hexyl-1-undecyl, w is 3 or an average of about 3, and M is sodium or potassium.

11. A formulation of claim 1 wherein R is 3-hexyl-1-undecyl, w is 4 or an average of about 4, and M is sodium or potassium.

12. A formulation of claim 1 wherein R is 3-hexyl-1-undecyl w is 5 or an average of about 5, and M is sodium or potassium.

13. A formulation of claim 1 wherein R is 3-hexyl-1-undecyl w is 6 or an average of about 6, and M is sodium or potassium.

14. A formulation of claim 10 wherein B) is an alcohol.

15. A single phase formulation consisting essentially of a (A) sulfated ethoxylate of 3-hexyl-1-undecanol having an average of 1 to 6 ethyleneoxy groups per molecule, (B) an alkanol having up to 10 carbon atoms per molecule, (C) sodium chloride, (D) oil, and (E) water.

16. A formulation of claim 15 wherein said alkanol is 1-butanol.

17. A formulation of claim 1 wherein the proportions of A) and B) are from about 0.5 to about 3 parts by weight of B) to one part by weight of A).

18. A formulation of claim 1 wherein the proportions of A) and B) are from about 0.8 to about 2.5 parts by weight of B) to one part by weight of A).

19. A formulation of claim 15 wherein the proportions of A) and B) are from about 0.5 to about 3 parts by weight of B) to one part by weight of A).

20. A formulation of claim 15 wherein the proportions of A) and B) are from about 0.8 to about 2.5 parts by weight of B) to one part by weight of A).

* * * * *